Patented July 19, 1938

2,124,494

UNITED STATES PATENT OFFICE 2,124,494

METHOD OF IMPROVING VERMIN EXTERMINATING COMPOSITIONS AND THE RESULTING COMPOSITIONS

Karl Memminger, Magdeburg-Sudost, Germany, assignor to Fahlberg-List Aktiengesellschaft Chemische Fabriken, Magdeburg-Sudost, Germany No Drawing. Application November 20, 1936, Serial No. 111,961. In Germany September 8, 1931

3 Claims. (Cl. 167—40)

Vermin exterminating compositions composed of sulphur, solid combustible carbon-containing materials, for example sawdust, and compounds which give off oxygen, for example saltpetre or manganese dioxide, and which may also contain other substances, for example metal powder, warning substances, smoke producing materials and the like are well known. These compositions, on being burnt, give off a mixture of gases which destroys the vermin. For use, the composition is generally put up in the form of a cartridge which is burnt in a convenient manner with the exclusion of air, in some cases in apparatus which is specially constructed for the purpose. The combustion gases which are developed consist mainly of carbon monoxide, carbon dioxide, sulphuretted hydrogen and sulphur dioxide. The composition has a greater effect the more carbon monoxide and sulphuretted hydrogen it develops when it is burnt, as the remaining constituents of the gases of combustion are only of secondary importance.

It has now been found that these vermin exterminating compositions which lead to the evolution of sulphuretted hydrogen and carbon monoxide and consist of sulphur, solid combustible carbon-containing materials and compounds which give off oxygen and, in some cases, also contain other substances, can be very considerably improved in many directions. This result is obtained, in accordance with the invention, by incorporating or distributing in vermin exterminating compositions of the aforesaid kind, during or after their manufacture, liquid or fusible compounds of substances of high molecular weight which are rich in carbon and contain hydrogen and are inflammable with difficulty, but can be burnt when in a state of fine subdivision, that is to say they can only be burnt with the aid of a wick. These substances are incorporated, in quantities not exceeding 10%, by means of a spraying nozzle or other atomizing apparatus, so that they are very finely divided and distributed. Compounds of high molecular weight containing carbon and hydrogen which have proved suitable are, for example, difficultly combustible oils and fats of vegetable, animal and in some cases also of mineral origin. Suitable oils or fats of vegetable and animal origin are for example rape seed oil, linseed oil or train oil, while suitable oils of mineral origin are, for example, naphthene acids and the like.

The amount of the additional substances which is added varies in accordance with the composition of the vermin exterminating composition in other respects, on the kind of additional substance employed and on the particular purpose for which the composition is to be used and, in order to obtain the effect desired, amounts to about 4–10%. The most suitable quantity for any particular case can easily be determined by some simple preliminary experiments.

The addition, in accordance with the invention, of finely divided difficultly combustible substances of the kind set forth has the result that the gases obtained on combustion are considerably increased in quantity, for example by about 25 to 30%. Further, the proportions of the most valuable, i. e. poisonous, constituents of the gases of combustion, namely sulphuretted hydrogen and carbon monoxide, are considerably increased for example by about 30–140%, while the proportion of carbon dioxide in the gases is reduced. A further improvement which is of very great value in practice which can be obtained by the addition of substances of the kind stated is that the duration of the combustion of the vermin exterminating composition is very considerably prolonged without the uniformity with which the combustion proceeds being detrimentally affected in any way. Definition of terms used hereinafter in the claims:—

1.—"A solid combustible carbon-containing substance" is defined as sawdust or its equivalent for the purposes described.

2.—"A substance which is able to give off oxygen" is defined as salt-petre, manganese dioxide or their equivalents for the purposes described.

3.—"A hydrogen-containing substance which is of high molecular weight and rich in carbon, and is difficultly combustible but can be burnt when in a state of fine sub-division" is defined as rape seed oil, linseed oil, train oil, naphthene acids, or their equivalents for the purposes described.

The results obtained may perhaps be explained in the following manner:

The additional substances of high molecular weight decompose on combustion to form complex intermediate products the nature of which is not yet clear and finally form carbon-like substances which have a reducing action, that is to say, they promote the formation of carbon monoxide and sulphuretted hydrogen. These carbon-like substances, however, require for their oxidation a part of the oxygen present and, therefore, prevent a far-reaching formation of carbon dioxide from the carbon-containing substances in the cartridge, while they themselves are burnt to form carbon monoxide. In a similar way, the hydrogen in the substances which are added in accordance with the invention can promote the formation of sulphuretted hydrogen since, for example, water which is formed as an intermediate product is decomposed by the action of carbon into oxygen and hydrogen which are then converted into carbon monoxide and sulphuretted hydrogen. As will be easily understood, with an increased formation of carbon monoxide from the same amount of oxygen present, larger quantities of gas are developed than when carbon dioxide is formed in greater proportions.

If the effects indicated are to be obtained, the manner in which the difficultly combustible substances are incorporated into the complete mixture and the quantities in which they are added to it are important. Since they can be burnt only by means of a wick, they must be added in a state of fine subdivision and in quantities which do not exceed 10%, in order that, when combustion takes place, they may be able to utilize the sawdust or similar solid combustible carbon-containing material as it were as a wick. If the difficultly combustible additional materials were not added in a state of fine subdivision and therefore of uniform distribution or were added in too large quantities, then the particles of wood or the like would be partly or wholly super-saturated. The consequence of this would be that the super-saturated wood particles would not take part in the normal course of the combustion, since the heat produced in the cartridge would no longer be sufficient. In such cases, therefore, the addition of difficultly combustible materials not only would not produce an increase in the poisonous effect, but would make combustion partly or even wholly impossible.

As has already been briefly mentioned, the proposal has previously been made to incorporate other substances in vermin exterminating compositions consisting of sulphur, carbon-containing substances, such as wood charcoal or sawdust, and substances which contain or give off oxygen such as nitre. The substances which it was proposed to add were those which, like tarry distillation products for example, produce smoke or substances which, like naphthalene, camphor, p-dichlorobenzene, hexachloroethane or arsenic compounds volatilize with or without being decomposed during the combustion process and thereby act as auxiliary poisons. Such additional substances are not contemplated for obtaining the results in accordance with the present invention, since the most they do is to act partly to produce smoke and partly to support combustion, but they are never able to fulfill the functions of the difficultly combustible substances which are employed in a state of fine subdivision in accordance with the present invention, namely to increase the content of sulphuretted hydrogen and carbon monoxide in the gases of combustion, to vary the proportion of carbon monoxide to sulphuretted hydrogen in the combustion gases considerably in favour of the former and to prolong considerably the duration of combustion while increasing the quantity of gas produced without giving rise to any detrimental effects.

I claim:—

1. The method of improving vermin exterminating compositions which evolve hydrogen sulphide and carbon-monoxide upon being burnt and which comprise sulphur, a solid carbon-containing substance and a substance which is able to give off oxygen, which consists in intimately mixing at least one substance selected from the group consisting of liquid oils and fusible fats of animal, vegetable and mineral origin in a finely divided state with the composition during its manufacture in an amount up to and including 10% of such composition.

2. A vermin exterminating composition which evolves hydrogen sulphide and carbon-monoxide upon being burnt, comprising sulphur, a solid combustible carbon containing substance, a substance which is able to give off oxygen and at least one substance selected from the group consisting of liquid oils and fusible fats of animal, vegetable and mineral origin in an amount up to and including 10%.

3. A vermin exterminating composition which evolves hydrogen sulphide and carbon-monoxide upon being burnt, comprising sulphur, a solid combustible carbon containing substance, a substance which is able to give off oxygen and 4% to 10% of at least one substance selected from the group consisting of liquid oils and fusible fats of animal, vegetable and mineral origin.

KARL MEMMINGER.